3,005,785
POLYMERS CONTAINING ESTER AND
CARBOXYL GROUPS
John F. Jones, Cuyahoga Falls, Harold Tucker, Akron,
and Lawrence F. Arnold, Avon Lake, Ohio, assignors
to The B. F. Goodrich Company, New York, N.Y., a
corporation of New York
No Drawing. Filed Mar. 31, 1958, Ser. No. 724,889
19 Claims. (Cl. 260—2.1)

This invention relates to partial esters of polymeric alpha-beta unsaturated monocarboxylic anhydrides or acrylic anhydrides in which not more than about half of the carboxyl groups attached to the main polymer chain are esterified to methods for their preparation and more particularly pertains to partial ester derivatives of polyacrylic anhydrides in which the ester groups are interspersed or attached to the main polymer chain so that not more than two adjacent carboxyl groups are free and not more than two adjacent carboxyl groups are converted to ester linkages and to methods for preparing the partial esters by treating polymeric anhydrides of the alpha-beta unsaturated monocarboxylic acids with a primary or secondary alcohol or a phenol.

The polymeric anhydrides of alpha-beta unsaturated monocarboxylic acids or acrylic or substituted acrylic acids have a series of recurring

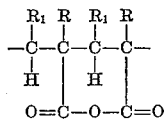

units which may be referred to as alpha-methylene glutaric anhydride groups. In the above formula R represents hydrogen, chlorine, fluorine, bromine, a cyano group, an alkyl group having from 1 to about 10 carbon atoms, an aryl group, an aralkyl group or an alkaryl group and $R_1$ represents hydrogen, chlorine, bromine and fluorine. Thus, the polymer is a polymeric anhydride of acrylic acid or a substituted derivative thereof. When the anhydride polymer is reacted with a primary or secondary alcohol the anhydride group is ruptured and the reaction is controlled, so that only one of the carboxyl groups is esterified and the other carboxyl group remains free.

The reaction between the polymeric anhydride and an alcohol or phenol proceeds in accordance with one of the two following formulas:

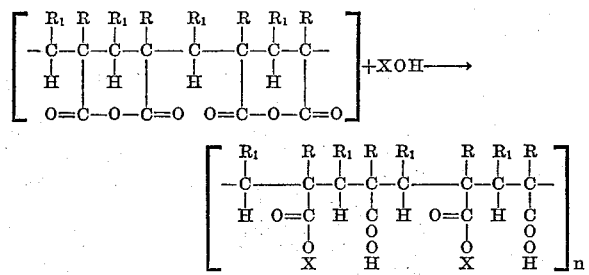

to form alternate ester and carboxyl groups or

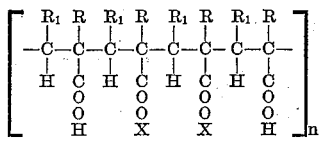

to form a structure in which adjacent carboxyl groups are esterified. It is highly probable that both forms of the reaction occur. However, in opening the anhydride linkages, only one of the carboxyl groups is esterified and the other one remains unreacted. Thus, if all the anhydride groups are reacted one-half of the carboxyl groups will be free and the other half will be esterified, but not more than two adjacent carboxyl groups will be free nor will more than two adjacent ester linkages be present.

Prior to the invention this type of spacing of ester groups on an acrylic polymer chain was not possible. Copolymers of acrylic and substituted acrylic acids with acrylic esters or esters of substituted acrylic acids are known. In these copolymers, however, the spacing of carboxyl ester groups attached to the main polymer chain is more or less random and not evenly distributed. The even distribution of the ester groups along the chain provides unusual properties in the polymers.

One method of preparing linear anhydride polymers comprises polymerizing glacial acrylic acid or substituted derivatives thereof in the presence of an inert diluent such as benzene and an excess of a dehydrating agent such as acetic anhydride, in the presence of catalytic amounts of a free radical catalyst at a temperature of about 50° C. to about 70° C.

Cross-linked acrylic anhydride polymers in which the cross links are not destroyed by scission of the anhydride linkages can be prepared by copolymerizing a polyunsaturated monomer, such as a polyallyl sucrose having at least three allyl groups per sucrose molecule, with a glacial acrylic acid or a substituted derivative thereof in an inert diluent and in the presence of a free radical polymerization catalyst and in the presence of a dehydrating agent, such as acetic anhydride. These polymeric anhydrides and their methods of preparation are described more fully and claimed in the copending application Serial No. 555,308, filed December 27, 1955, by John F. Jones.

The monocarboxylic, alpha-beta unsaturated carboxylic acids that can be used in preparing the anhydride polymers have the structure

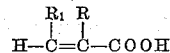

in which R and $R_1$ each has the same designation as above. Specific anhydride polymers are those made from acrylic acid, methacrylic acid, alpha-ethyl, propyl, butyl, amyl, hexyl, heptyl, octyl, nonyl and decyl acrylic acids, alpha-chloro, bromo and fluoro acrylic acids, alpha-cyano acrylic acid, alpha-benzyl acrylic acid, alpha-tolyl acrylic acid and other alpha-substituted acrylic acids with hydrocarbon substituents up to about 10 carbon atoms. The preferred anhydride polymers are those made from acrylic, methacrylic, alpha-chloro acrylic and alpha-cyano acrylic acid. The most preferred anhydride polymers are those made from acrylic and methacrylic acid and mixtures of said acids. All these anhydride polymers contain the recurring generic structure:

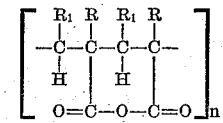

in which $n$ is an integer greater than 1 and R and $R_1$ have the same designation as above. If the anhydride polymer is a homopolymer each R will represent the same substituent and $R_1$ will also represent the same group. If the anhydride is prepared from a mixture of different acrylic or substituted acrylic acids then R and $R_1$ may each be different and may be one or more of the substituents defined above.

The partial esters of this invention can be prepared by reacting the anhydride form of the polymers with primary or secondary aliphatic alcohols or a phenol each of which is free of primary or secondary amine groups. Unsaturated alcohols and polybasic alcohols can also be reacted. The reaction is preferably carried out in an inert diluent such as a liquid hydrocarbon or halogenated hydrocarbon in which the alcohol is soluble, in the presence of a trace of an alkaline tertiary amine such as pyridine, at a slightly elevated temperature of from about 50–100° C. The reaction will proceed at room temperature but the rate is too slow for practical purposes. When the alcohol or phenol used in the esterification reaction contains a tertiary amine substituent it is not necessary to use the tertiary amine esterification catalyst mentioned above.

Specific alcohols are methanol, ethanol, n and secondary propanols, n and secondary butanols, n and secondary pentanols, n and secondary hexanols, n and secondary heptanols, n and secondary octanols, n and secondary nonanols, n and secondary decanols, n and secondary dodecanols, n and secondary tetradecanols, n and secondary octadecanols, n and secondary eicosanols, cycloaliphatic alcohols such as cyclopentanol and cyclohexanol, heterocyclic alcohols such as furfuryl alcohol and tetrahydrofurfuryl alcohol. Aromatic alcohols include phenol, cresol, resorcinol, phoroglucinol, hydroquinone, alpha and beta naphthols and the like.

Illustrative polyols are ethylene glycol, polyethylene glycols, 1,2-propanediol, 1,3-propanediol, 1,2-butanediol, 1,3-butanediol, 1,4-butanediol, glycerol, erythritol pentaerythritol, mannitol, sorbitol, glucose, levulose, sucrose, starch, cellulose, polyvinyl alcohol and other polyhydric alcohols.

Other alcohols which contain substituents which are non-reactive with the anhydride linkages, such as acid or tertiary amino groups, include, dimethyl amino ethanol, diethyl amino ethanol, dipropyl amino ethanol, dibutyl amino ethanol, 2-chloroethanol, 2-bromoethanol, beta-hydroxy propionic acid, monoalkyl ethers of ethylene glycol, 3-nitropropanol and other alcohols which have neither a thiol nor a primary or secondary amino group.

It is possible to have ester, free carboxyl, and anhydride groups on the same polymer chain by reacting the polymer with less than stoichiometric quantities of primary or secondary alcohol or phenol to form a polymer having from as low as about 0–5% to as much as about 80% of the anhydride groups unreacted. Stated differently, at least 20 mole percent of the anhydride groups present in the polymer are reacted with a primary or secondary alcohol or phenol. The free carboxyl groups and the anhydride groups can thereafter be converted to salts if desired.

The examples which follow are intended to be illustrative only and not as limitations on the invention. All parts are by weight unless otherwise specified.

EXAMPLE I

To a mixture of about 10% glacial acrylic acid and 90% benzene was added a mole of acetic anhydride for each mole of acrylic acid. Sufficient benzoyl peroxide was added to provide a concentration of 2% based on the acrylic acid. Air was swept out of the polymerization flask with nitrogen, the flask was sealed and the temperature was adjusted to 50° C. After about 16 hours the reaction was complete and the linear polyacrylic anhydride formed as a white, fluffy powder suspended in benzene. The polymer was filtered, washed with benzene and then dried in a vacuum oven at 50° C.

The partial methyl ester of polyacrylic anhydride was prepared by treating the polymer in a benzene slurry with about one mole of methanol for each mole of anhydride groups in the presence of a trace of pyridine as an esterification catalyst. The esterification was carried out at 50° C. for 16 hours. The resulting partial methyl ester was soluble in water and ethanol. It formed fairly viscous solutions in water and formed a clear, colorless, flexible film on drying of the solutions. This polymer is useful as a thickening agent and as an emulsifying agent for 70–30 mixtures of water and hexane.

Polymethacrylic anhydride is prepared by substituting glacial methacrylic acid for acrylic acid and following the technique described above.

EXAMPLE II

Another polyacrylic anhydride was prepared by the method described in Example I. The polymer was isolated by filtration and washed free of acetic anhydride with benzene. It was then dried in a vacuum oven at 50–60° C.

Half esters were prepared by making 10% solutions of the anhydride polymer in several different liquid alcohols and a halohydrin. The solutions were warmed to 50° C. and agitated for 24 hours. The partial esters were then precipitated with hexane, filtered and dried. The alcohols employed in this method of preparing the half esters were ethanol, n-butanol, n-pentanol, n-hexanol and allyl alcohol. The halohydrin was ethylene chlorohydrin. All the partial esters were soluble in acetone, methanol, and benzene and formed clear, colorless films from solution. The water sensitivity of the films decreased as molecular weight of the alcohol use in esterification increased. The partial ethyl ester is a good suspending or thickening agent in alkaline water solution. The partial butyl ester is an excellent adhesive for bonding glass to glass, or aluminum foil to glass. The partial allyl ester can be cured in cement or film form by the use of a small amount of a free radical catalyst, such as benzoyl peroxide.

The partial n-pentyl ester-ammonium salt, prepared by neutralizing the carboxyl groups of the partial ester with ammonium hydroxide is a very good stiffening agent for cotton and cellulose triacetate. It does not materially affect the tensile or tear strength or abrasion resistance of the fiber. A 1% solution of the partial-n-pentyl ester-ammonium salt was prepared by adding one part of the partial ester-partial acid polymer to 100 parts of 1% ammonium hydroxide. A cotton print cloth and a cellulose triacetate cloth each was padded in the solution and air dried to give about 1.5% pick-up on a dry basis. The data below summarize the results obtained.

Cotton

| | Untreated control | Treated sample | Cellulose untreated control | Triacetate treated sample |
| --- | --- | --- | --- | --- |
| Clark stiffness (cm.) | 6.2 | 11.2 | 50 | 539 |
| Stoll flex abrasion-cycles | 1 530 | 690 | 2 39 | 39 |
| Elmendorf tear (w./o. wt.) (lbs.) | .85 | .88 | .57 | .52 |
| Tensile (lbs./in.) | 47 | 49 | 32 | 32 |
| Crease angle | 82 | 65 | 82 | 77 |

1 ½# on head, 2# on yoke.
2 1# on head, 2# on yoke.

No visible color change was observed in the cotton after 40 hours in a fadeometer.

The partial ester formed by reaction with ethylene chlorohydrin, on analysis showed that about 90% of the anhydride linkages reacted to form one ester group and one carboxyl group.

Partial esters of the anhydride copolymers of (1) acrylic and methacrylic acids, (2) acrylic and alpha-bromo acrylic acids and (3) methacrylic and alpha-bromo crylic acids and the above-mentioned alcohols were prepared by the procedure described above. The partial esters were all soluble in acetone, methanol, benzene, gamma-butyro-lactone and dimethylformamide and all were excellent cements.

The properties of these partial esters are different from those of copolymers of acrylic acid and acrylic esters. For purposes of comparison a series of copolymers of acrylic and substituted acrylic acid and acrylic and substituted acrylic esters were prepared by making 10% solutions of the monomers in benzene, adding 2% caprylyl peroxide sweeping with nitrogen, sealing the flasks and adjusting the temperature to 50° C. The polymerization conditions were substantially the same as those used for preparing the anhydride polymers, with the exceptions that the dehydrating agent was not present and an ester of an acrylic or substituted acrylic acid was also included in the monomer mixture.

Thus copolymers of 45.6% acrylic acid and 54.4% methyl acrylate; 41.8% acrylic acid and 58.2% ethyl acrylate; 20%, 24%, 28%, 32%, 36%, 40% and 52% acrylic acid with 80%, 76%, 72%, 68%, 64%, 60% and 48% respectively of butyl acrylate, 46.2% methacrylate acid and 53.8% methyl methacrylate were prepared. None of these copolymers was completely soluble in acetone, methanol, gamma-butyrolactone or dimethylformamide.

EXAMPLE III

A mixture of 20 grams of linear acrylic anhydride and 200 grams of lauryl alcohol was held at 50° C. for several days in the absence of an esterification catalyst and at the end of this term a clear solution resulted. The partial ester was precipitated from solution as a fine, fluffy white powder upon addition of excess hexane to the mixture. The polymer was filtered, washed with additional hexane and dried. The partial ester recovered weighed 26 grams. It was soluble in ethanol and methyl ethyl ketone, but was insoluble in water. This polymer was an excellent emulsifying agent for a 70:30 heptane water mixture. Films of the partial ester were not sensitive to water.

Partial esters of lauryl alcohol were also prepared by dissolving the alcohol in benzene, adding 19 grams of the linear polyacrylic anhydride and 6 drops of pyridine, and then heating to 50° C. for 24 hours. One partial ester was prepared from a solution of 26 grams of lauryl alcohol in benzene and another with 13.5 grams of the alcohol in benzene. The partial esters made by this method were soluble in acetone and, with difficulty in water.

EXAMPLE IV

A series of partial esters were prepared by preparing slurries of 10 grams of linear polyacrylic anhydride in benzene adding to each slurry one of the alcohols in the quantity indicated in the table below. All esterifications were carried out at a temperature of about 50° C. or higher.

Table I

| Alcohol | Amount in grams | Solubility |
| --- | --- | --- |
| Methallyl alcohol | 25 | Gamma-butyrolactone. |
| Pentanol-3 | 20 | DMF.[1] |
| 2-nitro-1-pentanol | 25 | Gamma-butyrolactone. |
| Butanol-2 | 20 | Do. |
| Isobutanol | 24 | DMF. |
| 2-4-dimethyl-1-pentanol | 25 | Gamma-butyrolactone. |
| n-Nonanol | 50 | Do. |
| Geraniol | 50 | 5% NaOH. |
| Myristyl alcohol | 50 | Acetone. |
| n-Undecanol | 80 | Swollen in DMF. |
| n-Heptadecanol | 70 | Do. |
| Cetyl alcohol | 50 | Acetone. |
| n-Octadecanol | 18.5 | DMF. |
| Ceryl alcohol | 50 | Swollen in DMF. |
| Keryl alcohol | 30 | 5% NaOH. |
| 3-chloro-1-propanol | | Do. |

[1] Dimethylformamide.

Each of the partial esters could be deposited from solution to form films. The film prepared from the partial ester of methallyl alcohol and that from the partial ester of geraniol can be further polymerized by heating in the presence of a free radical catalyst such as benzoyl peroxide to form a hard tough film. The partial esters of the higher alcohols such as undecanol or ceryl alcohol are soluble only with some difficulty, but they are excellent emulsifying agents in the presence of sodium, potassium or ammonium hydroxide solution. The organic solvent solutions of all the partial esters of this example are excellent adhesives for bonding glass to glass or metal to glass.

EXAMPLE V

A series of partial esters was prepared in which glycol monoethers were employed as the alcohols. The procedure consisted of preparing slurries of about 10 grams of linear polyacrylic anhydride in an excess of benzene, usually about 200 ml., adding the alcohol together with a few drops of a tertiary amine and heating the mixture to about 50° C. for a period of about 24 hours. Table II contains a list of glycol monoethers employed in preparing partial esters, the amounts in grams used in the reaction and the solubility characteristics of the derivative.

Table II

| Glycol monoether | Amount used, grams | Solubility |
| --- | --- | --- |
| Diethylene glycol monoethyl ether | 38 | 5% NaOH. |
| Diethylene glycol monobenzyl ether | 60 | Swollen in DMF. |
| Ethylene glycol monoethyl ether | 20 | Do. |
| Ethylene glycol monobutyl ether | 50 | Swollen in methanol. |
| | 40 | Soluble in 5% NaOH. |
| Ethylene glycol monobenzyl ether | 50 | Insoluble. |
| Polyethylene glycol monomethyl ether (M.W. about 350) | 55 | Gamma-butyrolactone. |

The solubility behavior of these partial esters is somewhat different from that of the esters of the aliphatic alcohols listed in Table I, in that only a few of the derivatives are soluble even in the very strong solvents used. Dry films of the diethylene glycol monoethyl ether derivative were very tough and rubbery. All, however, are good adhesives.

EXAMPLE VI

Alcohols with a cycloaliphatic ring also react with linear polyacrylic anhydride to form partial esters. Slurries of 10 grams of polyacrylic anhydride in about 200 ml. of benzene are prepared and then the alcohol and about 6 drops of a tertiary amine, such as pyridine, are added. The mixture is held at a temperature of about 50° C. for a period of about 24 hours to insure substantial completion of the reaction with anhydride groups without esterification of the carboxyl groups.

Listed below are several cycloaliphatic alcohols which were used to prepare partial esters.

Table III

| Alcohol | Amount (grams) | Solubility |
| --- | --- | --- |
| Cyclohexanol | 16 | DMF. |
| Furfuryl alcohol | 20 | Swollen in DMF. |
| Tetrahydrofurfuryl alcohol | 30 | Do. |
| Fenchyl alcohol | 25 | Do. |

Each of these partial esters could be prepared in the form of a film and each is a very good adhesive for bonding metals or glass to each other.

EXAMPLE VII

A series of phenols was reacted with linear polyacrylic anhydride by adding a phenol to a slurry of the anhydride in benzene. In each case 10 grams of the anhydride were added to 200 ml. of benzene, the phenol together with a few drops of pyridine were added and the reaction was held at a temperature of about 50° C. for 24 hours. In the table below are listed the phenols, the amounts used and the solubility of the derivatives.

Table IV

| Phenol used | Amount (grams) | Solubility |
|---|---|---|
| o-Bromophenol | 28 | Gamma-butyrolactone. |
| p-Bromophenol | 27.5 | Do. |
| 2-bromo-4-tertiary butyl phenol | 40 | DMF. |
| 2,4-dichloro-phenol | 26 | Gamma-butyrolactone. |
| o-Cresol | 20 | DMF. |
| m-Cresol | 20 | DMF. |
| p-Cresol | 20 | DMF. |
| p-Benzyl phenol | 27 | DMF. |
| p-Tertiary butyl phenol | 25 | Gamma-butyrolactone. |
| 4-tertiary butyl-7-chloro phenol | 30 | Do. |
| o-Cyclohexyl phenol | 24.5 | Do. |
| Diisobutyl phenol | 33 | Do. |
| 2-chloro-4-phenyl phenol | 58 | DMF. |
| 2,4-dinitro-4-chloro phenol | 40 | 5% NaOH. |
| 2,4-dinitro phenol | 30 | Do. |
| Eugenol | 27 | Do. |
| Carvacrol | 25 | DMF. |
| Hydroquinone monomethyl ether | 40 | Swollen in DMF. |
| o-Hydroxy acetanilide | 25 | Do. |
| p-Hydroxy acetanilide | 25 | Gamma-butyrolactone. |
| Meta-N-diethyl amino phenol | 28 | Do. |
| Acetoxy-o-methylamino-phenol | 25 | Do. |
| Acetoxy-p-methylamino-phenol | 25 | DMF. |
| 3,5-dimethyl phenol | 19 | DMF. |

The phenol derivatives listed above have a unique property in that they can be reacted further with aldehydes, including formaldehyde, acetaldehyde, propionaldehyde, butyraldehyde to form infusible and insoluble films. Solutions of the phenol derivatives are excellent adhesives.

EXAMPLE VIII

Other hydroxyl containing compounds can be reacted with linear polyacrylic anhydride to form partial esters which are soluble in certain solvents and which serve as excellent adhesive materials. The procedure for preparing the derivatives is the same as that described in Example V.

Table V

| Alcohol | Amount (grams) | Solubility |
|---|---|---|
| Glycolic acid | 25 | 5% NaOH. |
| Glyconitrile | 25 | DMF. |
| Beta-hydroxy propionitrile | 25 | 5% NaOH. |
| Gamma-hydroxy propionitrile | | Do. |
| Aldol | 30 | Do. |
| Diacetin | 50 | DMF. |
| Ethyl aceto acetate | 22 | 5% NaOH. |
| Kojic acid | 40 | Do. |

All the derivatives form tough flexible films. That formed with diacetin was very rubbery. All the solutions are very good adhesives. Although ethyl aceto acetate may not technically be considered as an alcohol it does form an enol with which the anhydride groups reacted.

EXAMPLE IX

A partial ester of linear polyacrylic anhydride and methyl lactate was prepared by the procedure described in Example V. This was also a good adhesive.

EXAMPLE X

A group of phenyl substituted aliphatic alcohols was reacted with polyacrylic anhydride by the slurry procedure described in Example V. The alcohols can contain other functional groups which are not reactive with anhydride or carboxyl groups.

Table VI

| Alcohol | Amount (grams) | Solubility |
|---|---|---|
| Benzyl | 35 | DMF. |
| Benzoin | 33 | DMF. |
| Cinnamyl alcohol | 38 | Swollen in DMF. |
| 2-phenyl ethanol | 40 | DMF. |
| 3-phenyl propanol | 40 | Swollen in DMF. |
| p-Tertiary amyl-phenoxy-ethanol | 60 | DMF. |

These derivatives also form water-insensitive films and in solution they can be used as adhesives. In addition to the above 2.5 g. of polyacrylic anhydride suspended in dry acetone were reacted with an excess of p-chlorophenoxy-ethanol, and another sample was reacted with an excess of 2,4-dichlorophenoxy-ethanol. The former alcohol reacted with about 76% of the anhydride groups and the latter reacted with about 87% of the anhydride groups. Tri-, tetra-, and pentachlorophenoxy-ethanols were also reacted with polyacrylic anhydride. These derivatives form very viscous mucilages in dilute aqueous NaOH. A derivative of

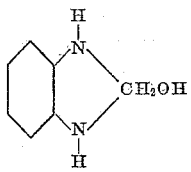

was prepared by reacting 0.1 of it with 0.1 mole of polyacrylic anhydride. Each derivative was soluble in dimethylformamide, acetone and 5% NaOH. This is a means for providing polymeric weed killers. They are also good adhesives.

EXAMPLE XI

Linear polyacrylic anhydride reacts with acetals to form unique derivatives in which one carboxyl group is esterified to an alkyl ester group and the other carboxyl forms an alkyl ether ester group. Thus, for example, methylal forms a derivative having the following structure:

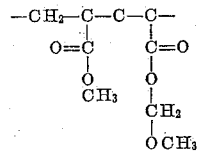

It is therefore possible to react substantially all the anhydride linkages on the polymer chain with equimolar or higher amounts of an acetal based on the anhydride groups to form a mixed ester-ether ester derivative having substantially the same number of ester and ether-ester groups on the polymer chain. It is also possible to convert less than all the anhydride linkages to ester-ether-ester derivatives and leave the remaining anhydride linkages unreacted, so that the unreacted anhydride groups can be converted to partial esters of the same or another alcohol, or to salts.

Other acetals which can be used included are acetal, propional, butyral, the acetals made from acrolein or crotonaldehyde and the lower molecular weight monohydric alkanols.

The procedure for preparing the derivatives of acetals is substantially the same as that for producing partial esters. A slurry of 10 grams of linear polyacrylic anhydride in 200 ml. of benzene was prepared. Twenty grams of methylal together with a few drops of pyridine were added to the benzene slurry. The mixing was heated to 50° C. and held at that temperature for about 24 hours. The polymer was not soluble in benzene. It was filtered and washed with additional benzene and then dried. The methyl-methoxy methyl ester derivative was swollen in dimethylformamide.

The derivatives formed by other acetals differ from that specifically described only in the groups attached to the side-chain of the polymer. Thus, acetal forms a

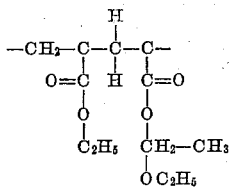

linkage and butyral forms a

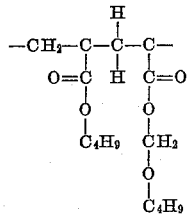

linkage.

If one-half mole of the acetal per mole of anhydride in the polymer, only about half the anhydride groups are converted to ester, ester-ether type linkages and the remaining anhydride groups are available for salt formation or for additional partial ester formation.

EXAMPLE XII

Primary or secondary alcohols containing tertiary amino linkages can also be reacted to form partial esters with the linear polyacrylic anhydride. The procedure described in Example V was followed with the exception that no catalyst was added and the time of reaction was only about an hour.

*Table VII*

| Alcohol | Amount | Solubility |
|---|---|---|
| Di(2-ethylhexyl)ethanol amine | 90 | Swollen in DMF. |
| Monomethyl-p-dimethyl hydantoin | 25 | Gamma-butyrolactone. |

The monomethyl dimethyl hydantoin forms an enol which reacts with the anhydride groups to form an ester.

In the case of amino alcohols the anhydride ring is opened to form an ester and the carboxyl groups reacts with additional amino compounds to form an amine salt. Thus, the polymer has both ester and salts of carboxylic acids and amines attached to the main polymer chain.

Alternately, the esterification process can be carried out by dissolving the linear anhydride polymer in a solvent such as dimethylformamide, or dimethyl sulfoxide or other solvents which do not react with the anhydride, adding the alcohol and heating to about 50° C. for about an hour to 24 hours depending on the nature of the alcohol or its concentration.

The reaction will also take place in the absence of a diluent if the alcohol is liquid at reaction temperature.

EXAMPLE XIII

A cross-linked polyacrylic anhydride was prepared by treating 25 grams of a copolymer of 99% acrylic acid and 1% allyl sucrose having 5.6 allyl groups per sucrose molecule with 500 ml. of acetic anhydride under reflux for 4 hours. The so treated copolymer was washed with benzene to remove the acetic anhydride-acetic acid mixture, and then the cross-linked polyacrylic anhydride-allyl sucrose copolymer was suspended in 500 ml. fresh benzene. 56 grams of ethylene chlorohydrin were then added to the benzene slurry and refluxed for 2 hours. The partial ester contained 13.5% chlorine which indicated that between 87 and 88% of the theoretical anhydride groups on the polymer reacted to form a partial ester with the alcohol.

Partial esters of ethanol and n-butanol were made by reacting one molar equivalent of one alcohol and the cross-linked polyacrylic anhydride copolymer described above. The partial esters then were treated with aqueous sodium hydroxide to neutralize about 75% of the free carboxyl groups. At 1.5% concentration in water the partial ethyl-ester-partial sodium salt had a viscosity of 24 as determined by a Brookfield Helipath viscosimeter, and the partial n-butyl derivative had a viscosity of 48 at the above concentration. Other partial esters were made with methanol, 8-hydroxyquinoline, n-octanol and isopropanol.

EXAMPLE XIV

A copolymer of 90% acrylic acid and 10% allyl sucrose, having 5–6 allyl groups per sucrose molecule was converted to its anhydride form by refluxing with acetic anhydride. The washed cross-linked polyacrylic anhydride was reacted with 1 equivalent of diethylaminoethanol, in an excess of benzene at 50° C. The partial ester derivative had a nitrogen content of 2.52%. This polymer is a good ion exchange resin having a mixed cationic-anionic character.

A collodion solution was added to a 10% solution of polyacrylic anhydride in dimethylformamide and held for 24 hours at 50° C. A precipitate which was insoluble in acetone was formed.

Cellophane, under the same conditions began to swell and then formed a gel and 5.6 grams of cotton yarn picked up 4.4 grams in weight under the above conditions. The cotton was highly swelled. Upon drying and washing with soapy water the cotton fibers again swelled.

Corn starch when so treated swells rapidly in dilute aqueous alkali to yield a clear thick gel. Soluble starch becomes insolubilized, but it is swelled in dilute aqueous alkali. Gum tragacanth loses its power to swell in water after treatment with the polyacrylic anhydride.

A uniform mixture of 10 grams of dry polyacrylic anhydride, 6.24 grams of $Na_2CO_3$ and 10 grams of sucrose was prepared. On adding sufficient of this mixture to make a 1.5% concentration in water, a highly viscous mucilage having a viscosity of 56 poise as determined on a Brookfield viscosimeter, was formed. A cross-linked polyacrylic anhydride made by reacting 99.5% acrylic acid and ½% allyl sucrose having 5 to 6 allyl groups per sucrose molecule in the presence of acetic anhydride was mixed with sucrose. The unmixed polymer had a mucilage viscosity of 97 in dilute aqueous NaOH and the mixture had a viscosity of 216 at 1.5% concentration.

The copolymeric, cross-linked anhydrides can be used in place of the linear polyacrylic anhydrides to prepare partial esters by following the procedures described for linear polyacrylic anhydride.

Partial esters of linear or cross-linked polymethacrylic anhydride can be made by the procedures described above.

EXAMPLE XV

A series of partial esters was prepared by adding an alcohol to a slurry containing 50 grams of polymethacrylic anhydride in an excess of benzene and rotating the mixture for 24 hours at 50° C.

| Alcohol | Weight in grams | Softening temperature of derivative degrees C. | Barcol hardness |
|---|---|---|---|
| Methyl | 30 | 192 | 55 |
| Ethyl | 13.4 | 113.5 | 43 |
| n-Propyl | 17.5 | 119 | 37 |
| Isopropyl | 17.5 | 121.5 | 37 |
| n-Butyl | 21.5 | 117.5 | 42 |
| n-Amyl | 25.6 | 103 | 34 |
| Isoamyl | 25.6 | 108 | 35 |
| n-Hexyl | 29.6 | 110 | 34 |
| n-Octyl | 37.8 | 109 | 23 |
| 2-ethyl hexyl | 37.8 | 104 | 27 |

The above-mentioned polymers were isolated as fine powders by suction filtration followed by air drying at 50° C. Hardness was determined on a fused pellet of each polymer. In each case the fused pellet was clear and essentially colorless.

From these data it is apparent that the derivatives have unusually high softening temperatures and completely unexpected hardness values. Each of these polymer derivatives is an excellent adhesive, each is truly thermoplastic and can be made into films or molded into shaped objects.

EXAMPLE XVI

Another group of partial esters was prepared by adding the alcohols listed below to a slurry of 10 grams of linear polymethacrylic anhydride in 200 ml. benzene and rotating the mixture at 50° C. for 24 hours.

| Alcohol | Weight in grams | Solvent for derivative |
|---|---|---|
| Isobutyl | 18 | Gamma-butyrolactone. |
| Sec. butyl | 20 | 5% NaOH. |
| Pentanol-3 | 30 | Gamma-butyrolactone. |
| 2,4-dimethyl pentanol-3 | 20 | Do. |
| Sec. butyl carbinol | 23 | Do. |
| Nonyl | 25 | 5% NaOH. |
| n-Undecyl | 50 | Do. |
| Lauryl |  |  |
| Myristyl | 50 | Gamma-butyrolactone. |
| Heptadecyl | 70 | Do. |
| n-Octadecyl | 50 | Do. |
| Cetyl | 80 | DMF. |
| Ceryl | 20 | DMF. |
| Keryl | 50 | DMF. |
| Methallyl | 25 | Gamma-butyrolactone. |
| Geraniol | 50 | 5% NaOH. |
| Furfuryl | 30 | Gamma-butyrolactone. |
| Tetrahydrofurfuryl | 30 | DMF. |
| Diethyl carbinol | 30 | Gamma-butyrolactone. |

These polymeric partial esters were worked up in the manner described in Example XV. Each of the polymers of this example has a softening temperature greater than 100° C. and each can be fused into useful molded articles.

EXAMPLE XVII

The partial allyl ester was prepared by adding 200 grams of linear polymethacrylic anhydride to an excess of allyl alcohol and permitting the mixture to stand for 24 hours at 50° C. The allyl-ester derivative had a softening temperature of 115° C. and a Barcol hardness of 43. This polymer could be reacted further by addition of a free-radical catalyst to form hard infusible resins.

EXAMPLE XVIII

A partial lauryl ester was prepared by adding 50 grams of polymethacrylic anhydride to 500 ml. of lauryl alcohol at 50° C. and holding the mixture at this temperature for 24 hours. Clear flexible films of the partial ester were made by pressing the powder at 180° C. under 20,000 pounds per square inch pressure.

EXAMPLE XIX

The following group of ether alcohols was reacted with polymethacrylic anhydride by the method described in Example XV.

| Alcohol | Weight In grams | Solvent for derivative |
|---|---|---|
| Ethylene glycol-monoethyl ether | 30 | Gamma-butyrolactone. |
| Ethylene glycol-mono n-butyl ether | 30 | Do. |
| Ethylene glycol-mono sec. butyl ether | 40 | DMF. |
| Diethylene glycol mono benzyl ether | 40–50 | 5% NaOH. / Gamma-butyrolactone. |
| Methoxy polyethylene glycol (mol. wt. 350) | 45 | 5% NaOH. |
| Diethylene glycol monoethyl ether | 42 | Do. |

Clear flexible films of these partial esters were made by fusing the powder in a platen press at 180° C. under 20,000 pounds per square inch pressure.

EXAMPLE XX

Other aliphatic alcohols having substituents other than hydroxyl groups can be used to prepare partial esters of polymethacrylic anhydride. The following compounds were reacted with polymethacrylic anhydride by the method described in Example XV.

| Alcohol | Weight in grams | Solvent for partial ester |
|---|---|---|
| Trimethylene chlorohydrin | 30 | Gamma-butyrolactone. |
| Glyconitrile | 25 | DMF. |
| Beta-hydroxy propionitrile | 25 | DMF. |
| Methylal | 20 | Gamma-butyrolactone. |
| Aldol | 20 | DMF. |
| Diacetin | 50 | 5% NaOH. |
| Glycollic acid | 25 | DMF. |

All the derivatives in this example were prepared by reacting 10 grams of polymer in a slurry of 200 ml. of benzene. The reaction temperature was 50° C. and the time was 24 hours. Each of the derivatives is an excellent adhesive.

EXAMPLE XXI

A partial ester derivative of polymethacrylic anhydride was prepared by adding 200 grams of the polymeric anhydride to an excess of ethylene cyanohydrin. The derivative had a softening temperature of 106° C. and it is an excellent adhesive.

The foregoing examples serve merely to illustrate and not to limit the scope of our invention of the new polymeric compositions having ester and carboxyl groups on the main polymer chain, said ester and carboxyl groups being so interspersed that not more than one acyl group of each anhydride group on a parent polyanhydride is esterified said scope being defined fully in the appended claims.

We claim:

1. The composition comprising the reaction product of a polymer consisting essentially of linear recurring anhydride units of the structure

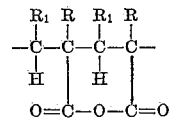

wherein R is a member of the class consisting of hydrogen, chlorine, fluorine, bromine, a cyano group and hydrocarbon groups having from 1 to about 10 carbon atoms and $R_1$ is a member of the class consisting of hydrogen, chlorine, bromine and fluorine, and as the sole reactant at least 20 mole percent based on said anhydride units of a compound having the structure X—OH wherein X is a member selected from the class consisting of hydrocarbon groups of from 1 to 20 carbon atoms and groups of from 4 to 20 carbon atoms having only tertiary amino nitrogen and hydrocarbon substituents, said product containing ester groups so interspersed on the main polymer chain that not more than one ester group is formed from each anhydride group.

2. The composition comprising the reaction product of a polymer consistnig essentially of linear recurring anhydride units of the structure

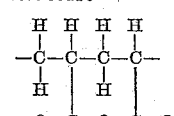

and as the sole reactant at least 20 mole percent based on said anhydride units of a compound having the structure X—OH wherein X is a member selected from the class consisting of hydrocarbon groups of from 1 to 20 carbon atoms and groups of from 4 to 20 carbon atoms having only tertiary amino nitrogen and hydrocarbon substituents, said product containing ester groups so interspersed on the main polymer chain that not more than one ester group is formed from each anhydride group.

3. The composition comprising the reaction product of a polymer consisting essentially of linear recurring hydride units of the structure

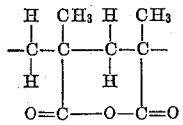

and as the sole reactant at least 20 mole percent based on said anhydride units of a compound having the structure X—OH wherein X is a member selected from the class consisting of hydrocarbon groups of from 1 to 20 carbon atoms and groups of from 4 to 20 carbon atoms having only tertiary amino nitrogen and hydrocarbon substituents, said product containing ester groups so interspersed on the main polymer chain that not more than one ester group is formed from each anhydride group.

4. The composition comprising the reaction product of a polymer containing (1) from 90 to 99% by weight of linear anhydride units of the structure

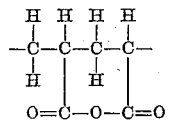

and (2) from 1 to 10% by weight of non-hydrolyzable interchain links, and as the sole reactant at least 20 mole percent based on said anhydride units of a compound having the structure X—OH wherein X is a member selected from the class consisting of hydrocarbon groups of from 1 to 20 carbon atoms and groups of from 4 to 20 carbon atoms having only tertiary amino nitrogen and hydrocarbon substituents, said product containing ester groups so interspersed on the main polymer chain that not more than one ester group is formed from each anhydride group.

5. The composition comprising the reaction product of a polymer consisting essentially of linear recurring anhydride units of the structure

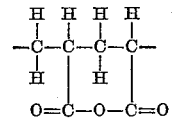

and as the sole reactant at least 20 mole percent based on said anhydride units of a compound having the structure X—OH wherein X represents a hydrocarbon group free of benzenoid unsaturation having from 1 to 20 carbon atoms, said product containing ester groups so interspersed on the main polymer chain that not more than one ester group is formed from each anhydride group.

6. The composition comprising the reaction product of a polymer consisting essentially of linear recurring anhydride units of the structure

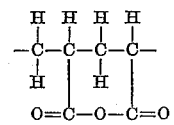

and as the sole reactant at least 20 mole percent based on said anhydride units of a compound having the structure X—OH wherein X represents a group free of benzenoid unsaturation having from 4 to 20 carbon atoms and having only tertiary amino nitrogen and hydrocarbon substituents, said product containing ester groups so interspersed on the main polymer chain that not more than one ester group is formed from each anhydride group.

7. The composition of claim 5 wherein X is an alkyl group having from 1 to 20 carbon atoms.

8. The composition of claim 6 wherein X is a trialkyl amino group having from 4 to 20 carbon atoms.

9. The composition comprising the reaction product of linear polyacrylic anhydride and as the sole reactant at least 20 mole percent based on said anhydride groups of ethanol, said product containing ethyl ester groups so interspersed on the main polymer chain that not more than one ethyl ester group is formed from each anhydride group.

10. The composition comprising the reaction product of linear polyacrylic anhydride and as the sole reactant at least 20 mole percent based on said anhydride groups of n-butanol, said product containing n-butyl ester groups so interspersed on the main polymer chain that not more than one n-butyl ester group is formed from each anhydride group.

11. The composition comprising the reaction product of linear polyacrylic anhydride and as the sole reactant from at least 20 mole percent based on said anhydride groups of n-pentanol, said product containing ester groups so interspersed on the main polymer chain that not more than one n-pentyl ester group is formed from each anhydride group.

12. The composition comprising the reaction product of linear polyacrylic anhydride and as the sole reactant at least 20 mole percent based on said anhydride groups of N,N-diethylamino ethanol, said product containing ester groups so interspersed on the main polymer chain that not more than one N,N-diethylaminoethyl ester group is formed from each anhydride group.

13. The composition comprising the reaction product of linear polymethacrylic anhydride and as the sole reactant at least 20 mole percent based on said anhydride of methanol, said product containing ester groups so interspersed on the main polymer chain that not more than one methyl ester group is formed from each anhydride group.

14. A method for preparing a partial ester from an anhydride polymer in which the ester groups are so interspersed that not more than one ester group is formed from each anhydride group on the polymer chain and in which at least 20 mole percent of the anhydride groups on the polymer chain are converted to the said partial esters, comprising bringing together a polymer consisting essentially of linear recurring anhydride units of the structure

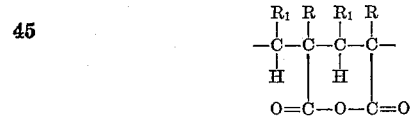

wherein R is a member of the class consisting of hydrogen, chlorine, fluorine, bromine, a cyano group and hydrocarbon groups having from 1 to 10 carbon atoms, and $R_1$ is a member of the class consisting of hydrogen, chlorine, bromine, and fluorine and as the sole reactant a compound of the structure X—OH wherein X is a member selected from the class consisting of hydrocarbon groups of from 1 to 20 carbon atoms and groups of from 4 to 20 carbon atoms having only tertiary amino nitrogen and hydrocarbon substituents, at a temperature of from about 50 to 100° C. in a diluent selected from the group consisting of said X—OH and an inert organic diluent.

15. A method for preparing a partial ester from an anhydride polymer in which the ester groups are so interspersed that not more than one ester group is formed from each anhydride group on the polymer chain and in which at least 20 mole percent of the anhydride groups on the polymer chain are converted to the said partial esters comprising bringing together a polymer consisting essentially of linear recurring anhydride units of the structure

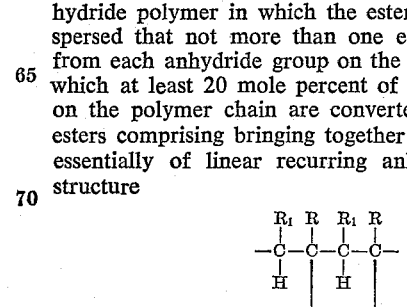

wherein R is a member selected from the class consisting of hydrogen, chlorine, fluorine, bromine, a cyano group and hydrocarbon groups having from 1 to 10 carbon atoms, and $R_1$ is a member of the class consisting of hydrogen, chlorine, bromine, and fluorine, and as the sole reactant a compound of the structure X—OH wherein X is a member selected from the class consisting of hydrocarbon groups of from 1 to 20 carbon atoms and groups of from 4 to 20 carbon atoms having only tertiary amino nitrogen and hydrocarbon substituents, at a temperature of from about 50 to 100° C. in an inert organic diluent in the presence of a basic catalyst.

16. The method of claim 15 wherein the inert organic diluent is benzene.

17. The method of claim 15 wherein the inert organic diluent is dimethyl formamide.

18. The method of claim 15 wherein the basic catalyst is pyridine.

19. A polymeric composition having ester and carboxyl groups on the main polymer chain, said ester and carboxyl groups being so interspersed that not more than one acyl group of each anhydride group on a linear parent polyanhydride is esterified, said polymeric composition having a plurality of

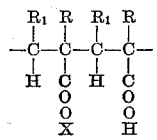

units corresponding to from 10 to 100 percent of the anhydride units present in the parent linear polyanhydride wherein R is a member of the class consisting of hydrogen, chlorine, fluorine, bromine, a cyano group and hydrocarbon groups having from 1 to 10 carbon atoms, $R_1$ is a member of the class consisting of hydrogen, chlorine, bromine, and fluorine, and X is a member of the class consisting of a hydrocarbon group of from 1 to 20 carbon atoms and groups having from 4 to 20 carbon atoms having only tertiary amino nitrogen and hydrocarbon substituents.

References Cited in the file of this patent

UNITED STATES PATENTS

| | | |
|---|---|---|
| 2,308,581 | Barnes | Jan. 19, 1943 |
| 2,402,604 | Coffman | June 25, 1946 |
| 2,615,845 | Lippincott et al. | Oct. 28, 1952 |
| 2,632,004 | Minsk et al. | Mar. 17, 1953 |
| 2,649,439 | Brown | Aug. 18, 1953 |
| 2,772,251 | Hansen et al. | Nov. 27, 1956 |
| 2,778,283 | Bettoli et al. | Jan. 22, 1957 |
| 2,851,448 | Slocombe et al. | Sept. 9, 1958 |

FOREIGN PATENTS

| | | |
|---|---|---|
| 450,455 | Great Britain | July 15, 1936 |

UNITED STATES PATENT OFFICE

CERTIFICATE OF CORRECTION

Patent No. 3,005,785　　　　　　　　　October 24, 1961

John F. Jones et al.

It is hereby certified that error appears in the above numbered patent requiring correction and that the said Letters Patent should read as corrected below.

Column 5, line 11, for "methacrylate" read -- methacrylic --; column 8, line 69, for "mixing" read -- mixture --; column 12, line 61, for "consistnig" read -- consisting --.

Signed and sealed this 21st day of August 1962.

(SEAL)
Attest:

ESTON G. JOHNSON
Attesting Officer

DAVID L. LADD
Commissioner of Patents